(12) United States Patent
Eriksen

(10) Patent No.: US 12,378,839 B2
(45) Date of Patent: Aug. 5, 2025

(54) ASYMMETRIC BEARING RING

(71) Applicant: TCO AS, Indre Arna (NO)

(72) Inventor: Tommy Eriksen, Voss (NO)

(73) Assignee: TCO AS, Indre Arna (NO)

( * ) Notice: Subject to any disclaimer, the term of this patent is extended or adjusted under 35 U.S.C. 154(b) by 143 days.

(21) Appl. No.: 17/837,514

(22) Filed: Jun. 10, 2022

(65) Prior Publication Data

US 2023/0400059 A1 Dec. 14, 2023

(51) Int. Cl.
| | |
|---|---|
| *E21B 33/12* | (2006.01) |
| *E21B 23/01* | (2006.01) |
| *E21B 33/134* | (2006.01) |
| *E21B 34/06* | (2006.01) |
| *F16J 15/02* | (2006.01) |
| *F16J 15/06* | (2006.01) |
| *F16J 15/10* | (2006.01) |

(52) U.S. Cl.
CPC .......... *E21B 33/1208* (2013.01); *E21B 23/01* (2013.01); *E21B 33/12* (2013.01); *E21B 33/134* (2013.01); *E21B 34/063* (2013.01); *F16J 15/022* (2013.01); *F16J 15/06* (2013.01); *F16J 15/104* (2013.01)

(58) Field of Classification Search
CPC ...... E21B 33/1208; E21B 33/12; E21B 23/01; E21B 33/134; E21B 34/063; F16J 15/104; F16J 15/022; F16J 15/06
See application file for complete search history.

(56) References Cited

U.S. PATENT DOCUMENTS

| | | | | |
|---|---|---|---|---|
| 4,384,730 | A * | 5/1983 | Diehl | F16J 15/0881 |
| | | | | 277/626 |
| 9,732,579 | B2 * | 8/2017 | Hiorth | E21B 33/12 |
| 11,359,453 | B2 * | 6/2022 | Kent | E21B 34/10 |
| 2012/0125631 | A1 * | 5/2012 | Entchev | E21B 33/12 |
| | | | | 166/376 |
| 2015/0075773 | A1 * | 3/2015 | Raggio | E21B 33/1208 |
| | | | | 166/135 |
| 2015/0337615 | A1 * | 11/2015 | Epstein | E21B 33/134 |
| | | | | 166/65.1 |
| 2018/0355976 | A1 * | 12/2018 | Markiw | E21B 34/142 |
| 2019/0032448 | A1 * | 1/2019 | Bjørgum | E21B 34/063 |
| 2021/0340836 | A1 * | 11/2021 | Brandsdal | E21B 33/1208 |
| 2023/0374881 | A1 * | 11/2023 | Nguyen | E21B 33/0353 |

\* cited by examiner

*Primary Examiner* — Nicole Coy
*Assistant Examiner* — Jennifer A Railey
(74) *Attorney, Agent, or Firm* — Flener IP & Business Law; Zareefa B. Flener

(57) ABSTRACT

An asymmetric bearing ring to support a plug is disclosed. The bearing ring is an annular ring with an inner surface and an outer surface, wherein the inner surface and the outer surface are not parallel. The bearing ring can be part of a plug tubular system including a tubular body and a plug assembly, where the tubular body include a housing, and the plug assembly arranged in the housing include a plug, the asymmetric bearing ring, and a seat which supports the plug; and wherein the asymmetric bearing ring is arranged between the plug and the seat and/or the asymmetric bearing ring is arranged between the plug and the housing.

18 Claims, 15 Drawing Sheets

ASYMMETRIC BEARING RING

FIELD OF INVENTION

The invention is in the field of bearing rings to protect a frangible plug. More specifically it relates to the specific shape of the bearing ring. Further it relates to a plug tubular which contains such a bearing ring.

BACKGROUND

During the drilling, testing, completion, fracking, production, and abandonment stages of hydrocarbon wells there are many uses for plugs assemblies that create a fluid barrier in the well. Some of these uses are not permanent such as plug and abandonment, but rather temporary, where it is desired to re-establish fluid flow at a later stage. Some examples of such temporary uses of plugs are for flotation, well testing during completion, packer setting and fluid loss devices.

When flow through the well is to be established, the frangible plug is broken. This is preferably done without spearing, milling, or other mechanical intervention from the surface. Some examples of ways to achieve the desired breaking is through the use of pressure, pressure pulses, or explosives. When the frangible plug is removed it allows for a nonrestricted fluid flow past the opened plug assembly, and for many applications after opening of the plug assembly this is required in order to pass various tools past the plug assembly.

Frangible materials such as glass or ceramics have the advantage of being relatively insensitive to pressure, temperature, and chemical corrosion, yet by their frangible nature they are relatively easy to destroy when used as the fluid blocking part of plug assemblies. Glass can be made to break into very small pieces that will not pose a problem in most wells. Frangible materials therefore allows for additional ways of opening the plug assembly, such as constructing the plug assembly with small amounts of explosives that will crush or shatter a glass disc, and open the plug assembly, but not damage the production tubing or casing the plug assembly is installed in.

A problem with many frangible plugs is that they can prematurely break where they contact a metal surface. This will cause the entire plug to break and the flow through to be established prematurely. One way to overcome this issue is to put a bearing ring of a soft material between the frangible plug and a hard metal surface (e.g., steel). This allows the force on the plug to be transferred to the bearing ring instead. The bearing ring will then act as a softer barrier and prevent the disc from coming in contact with a hard metal surface. However, these bearing rings can deform, especially when subjected to high pressure and temperature conditions and allow the frangible plug to make undesired contact with a hard metal surface.

ADVANTAGES OF THE PRESENT INVENTION

The present invention has a shape that allows for better force distribution and reduced deformation when high pressure and/or temperature is introduced to the frangible plug. Thus, the frangible plug is better protected. The Bearing ring prevents the frangible plug from moving and decoupling from the sealing arrangement. This can also enable the frangible plug to self-centralize.

SHORT SUMMARY OF THE INVENTION

In some aspects, the techniques described herein relate to an asymmetric bearing ring to support a plug including: an annular ring with an inner surface and an outer surface, wherein the inner surface and the outer surface are not parallel.

In some aspects, the techniques described herein relate to an asymmetric bearing ring, further including an inner surface angle and an outer surface angle, wherein: inner surface angle is the angle between a first transverse plane of the asymmetric bearing ring and the inner surface; and the outer surface angle is the angle between the first transverse plane, or a second transverse plane parallel to the first transverse plane, of the asymmetric bearing ring and the outer surface when; wherein the inner surface angle is not equal to the outer surface angle; and/or the asymmetric bearing ring further includes an inner thickness and an outer thickness wherein the inner thickness is not equal to the outer thickness.

In some aspects, the techniques described herein relate to the asymmetric bearing ring, wherein the inner surface angle is larger than the outer surface angle and/or wherein the inner thickness is smaller than the outer thickness.

In some aspects, the techniques described herein relate to the asymmetric bearing ring, wherein the inner surface angle is between 30 and 60 degrees and/or the outer surface angle is between 25 and 70 degrees.

In some aspects, the techniques described herein relate to the asymmetric bearing ring, wherein the inner surface angle is between 2 and 10 degrees of the outer surface angle.

In some aspects, the techniques described herein relate to the asymmetric bearing ring, wherein the inner thickness is between 0.5 mm and 3.0 mm, and/or the outer thickness is between 1.0 mm and 6.0 mm.

In some aspects, the techniques described herein relate to the asymmetric bearing ring, wherein the inner thickness is between 40% and 80% of the outer thickness.

In some aspects, the techniques described herein relate to a plug tubular system including a tubular body, and a plug assembly, the tubular body including a housing the plug assembly arranged in the housing including: a plug, an asymmetric bearing ring and a seat, wherein: the seat supports the plug; and wherein: the asymmetric bearing ring is arranged between the plug and the seat; and/or the asymmetric bearing ring is arranged between the plug and the housing.

In some aspects, the techniques described herein relate to the plug tubular system wherein a breaker object is arranged to break the plug.

In some aspects, the techniques described herein relate to the plug tubular system wherein the breaker object is an explosive breaker.

In some aspects, the techniques described herein relate to the plug tubular system the breaker object is arranged at a distance from the plug; and the breaker object is configured to break the plug when the breaker object touches the plug.

BRIEF DESCRIPTION OF THE FIGURES

The above and further features of the invention are a set forth with particularity in the appended claims and advantages thereof will become clearer from consideration of the following detailed description. Embodiments of the present invention will now be described, by way of example only, with reference to the following diagrams wherein:

REFERENCE NUMBERS AND
CORRESPONDING ELEMENTS

10 Asymmetric bearing ring 10
101 Symmetric Bearing Ring 101
11 Inner Surface 11
12 Inner Angle 12
13 Inner Thickness 13
14 Outer Surface 14
15 Outer Angle 15
16 Outer Thickness 16
17 Transverse Plane 17
18 Inside Edge 18
19 Outside Edge 19
20 Plug 20
30 Seat 30
40 Breaker Object 40
41 Breaker Holder 41
42 Breaker Assembly 42
43 Explosive Breaker 43
50 Shear Ring 50
60 Sealing Element 60
100 Plug Tubular 100
111 Housing 111
112 Tubular Body 112
113 Upstream Tubular Connection 113
114 Downstream Tubular Connection 114
115 First Tubular Section 115
116 Second Tubular Section 116

DETAILED DESCRIPTION OF THE
INVENTION

Reference will now be made in detail to the present embodiments of the invention, examples of which are illustrated in the accompanying drawings. Alternative embodiments will also be presented. The drawings are intended to be read in conjunction with both the summary, the detailed description, and any preferred and/or particular embodiments, specifically discussed or otherwise disclosed. This invention may, however, be embodied in many different forms and should not be construed as limited to the embodiments set forth herein. These embodiments are provided by way of illustration only. Several further embodiments, or combinations of the presented embodiments, will be within the scope of one skilled in the art.

A bearing ring can be placed between a frangible plug and any hard metal (e.g. steel) to prevent the plug from breaking before it is intended. In a symmetric bearing ring, the inner and outer surface is parallel. In an asymmetric bearing ring, the inner and outer surface is not parallel. We have found that an asymmetric bearing ring will often have better performance when compared to a symmetric bearing ring of the same material due to the non-parallel surfaces.

Figure 1A:
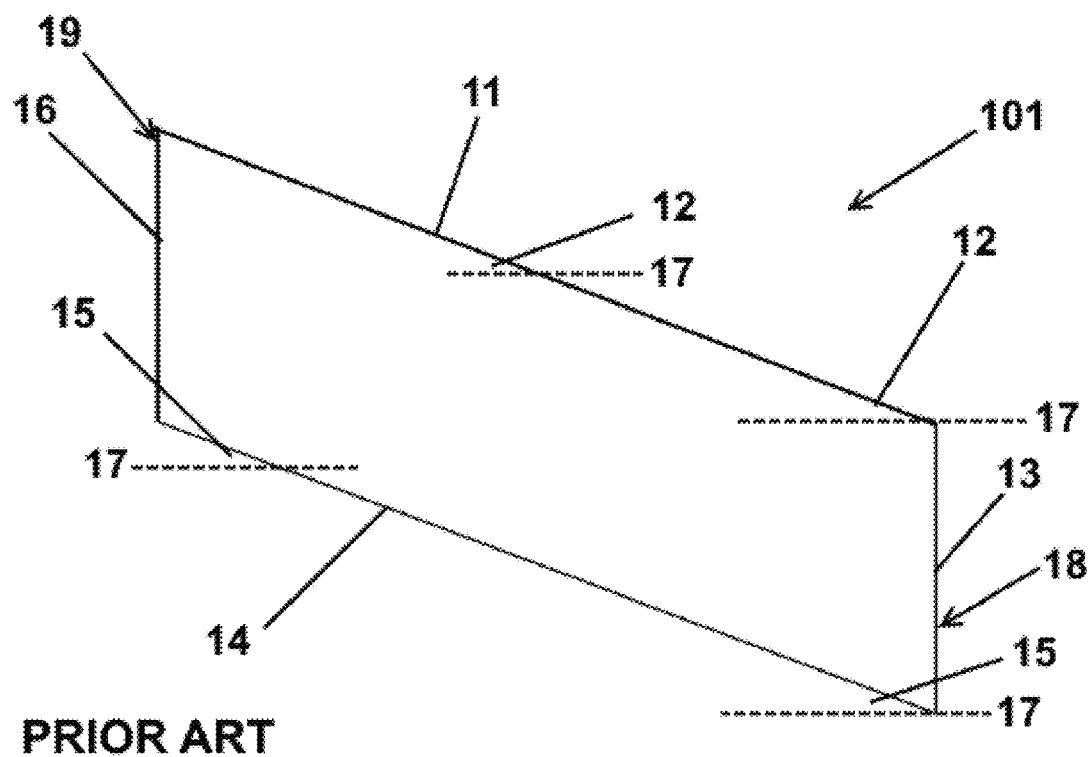
FIG. 1A discloses a two-dimensional cross-section of a symmetric bearing ring

FIG. 1A discloses a cross section of a symmetric bearing ring 101 where the inner surface 11 and the outer surface 14 are parallel. In the example shown the inner angle 12 and the outer angle 15 are equal. These angles are measured with respect to the transverse plane 17 (a 2D version is shown) from the outside edge 19 of the bearing ring 10. In the example shown, the inner thickness 13 is equal to the outer thickness 16. Note that a bearing ring 10 has an annular shape with an inside edge 18 and an outside edge 19.

The inner surface 11 of the bearing ring 10 is sloped in the example shown to match a chamfer in the plug 20 (not shown). Where the inner surface 11 and the outer surface have parallel surfaces, by the inner angle 11 and the outer angle 15 being equal or the inner thickness 13 and the outer thickness 16 are equal, this will be referred to as a symmetric bearing ring 101.

Without being bound by the theory: when the symmetric bearing ring 101 experiences a high enough temperature and/or pressure it will become soft enough to begin to compress by the pressure applied from the plug to the symmetric bearing ring 101. This load applied by the fluid pressure via the plug onto the bearing ring. There will come a point where a high enough temperature and/or pressure will cause the symmetric bearing ring 101 to deform to the point where the plug 20 will make contact with a surface which is hard enough to break the plug 20. This can be because the symmetric bearing ring 101 was pushed out of the way or because a portion of the symmetric bearing ring 101 thins out enough that the plug 20 is no longer protected from making contact with the metal surface. Because the inner angle 12 and the outer angle 15 are equal, the force between the plug 20 and the inner surface 11 will be the same as the force between the plug 20 and the outer surface 14. These equal forces will mean an even compression of the symmetric bearing ring 101.

Figure 1B:
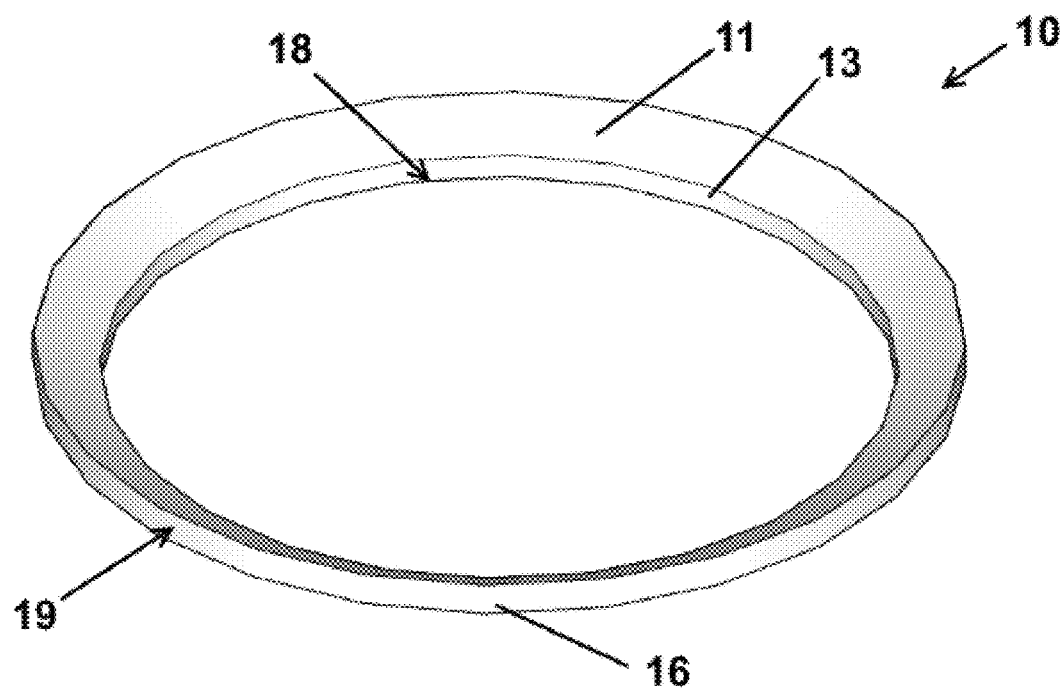
FIGS. 1B-1D disclose perspective views of an asymmetric bearing ring
Figure 1C:
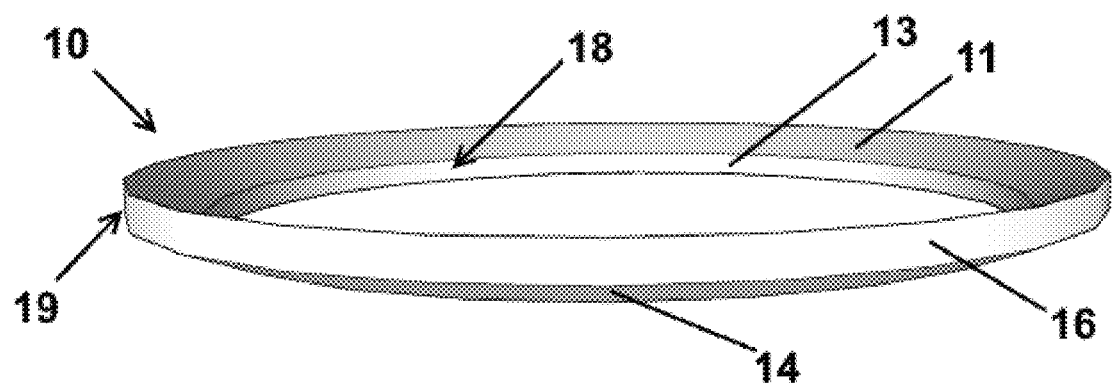
Figure 1D:
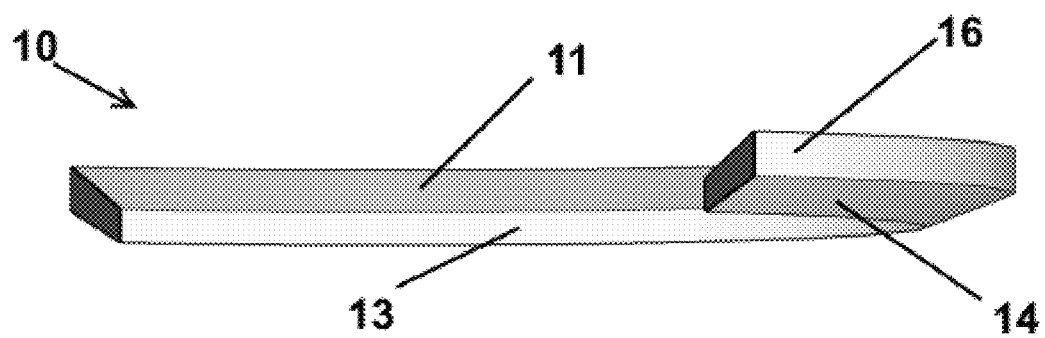

FIGS. 1B-1D disclose different views of an asymmetric bearing ring 10. Again, the bearing ring 10 comprises an inner surface 11 and an outer surface 14. The angle between a transverse plane 17 (a line in two dimensions) and the inner surface 11 is the inner angle 12. In the same way, the angle between a transverse plane 17. The inner edge 18 has an inner thickness 13 and the outer edge 19 has an outer thickness 16.

In asymmetric bearing ring 10, unlike the symmetric bearing ring 101, the inner surface 11 and the outer surface 14 are not parallel. In the example shown, where the cross section of the inner surface 11 and the outer surface 14 are straight lines, the inner angle 12 and the outer angle 15 are not equal. The inner thickness 13 and the outer thickness 16 are also not equal.

It is possible to have a case where the inner surface 11 and/or the outer surface 14 do not have cross sections of straight lines. This could possibly make the inner angle 12 different along the inner surface 11. This possibility also extends to the outer angle 15 and the outer surface 14. In such a case, a different measure of "parallel" may needed. In this case it is a comparison of the inner thickness 13 to the outer thickness 14. If these two are not equal, then it can be considered as an asymmetric bearing ring 10.

Without being bound by the theory: the asymmetric bearing ring 10 will become soft in the same manner as the symmetric bearing ring 101. This may be at the same or higher temperature and/or pressure. However, as opposed to the symmetric bearing ring 101, the asymmetric bearing ring 10 when softened will deform in a way that helps keep the asymmetric bearing ring 10 in place to protect the plug 20. As the inner angle 12 and the outer angle 15 are different, the forces experienced by the top and bottom of the bearing ring will be different. This allows the asymmetric bearing ring 10 to perform better, and reduce chances of premature breakage of the plug 20.

Note that it is possible for the asymmetric bearing ring 10 to have a groove or pocket or hole or cut-out to accommodate another element. For example, a breaker object 40 (not shown). That way the breaker object could pass through this opening in the bearing ring to apply force onto the plug and break it. If the bearing ring is thin in comparison to the force applied by a breaker object, the breaker can instead force its way through the bearing.

Figure 2:
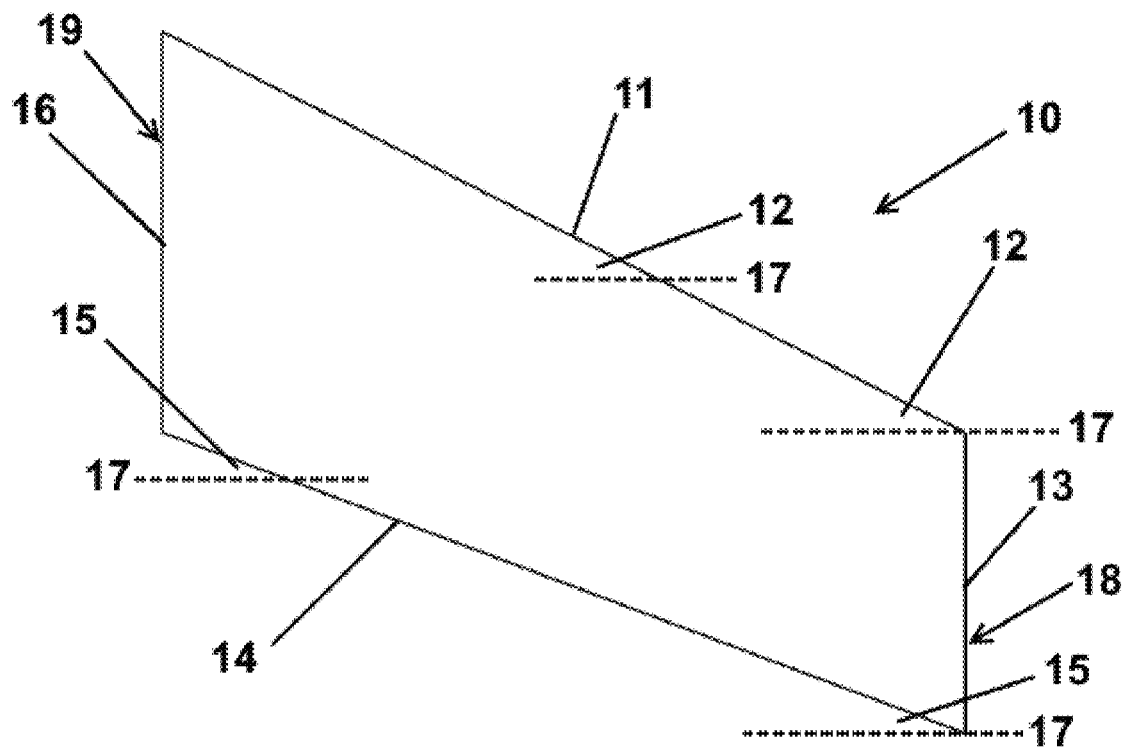
FIG. 2 discloses a two-dimensional cross-section of an asymmetric bearing ring

FIG. 2 discloses a two-dimensional cross-section of an asymmetric bearing ring 10.

Note that it is possible for the transverse plane 17 for the inner angle 12 and the outer angle 15 to be different transverse planes 17, but the transverse planes will be parallel to each other. FIG. 2 shows this in that the inner surface 11 and the outer surface 14 are both disclosed with two transverse planes 17. The inner angle 11 measured with be the same no matter which transverse plane 17 is used, because they are parallel. This argument is the same for the outer angle.

As discussed previously, the inner thickness 13 of the inner edge 18 and the outer thickness 16 of the outer edge 19 can be used to establish if the bearing ring is a symmetric bearing ring 101 or an asymmetric bearing ring 10.

Figure 3A:
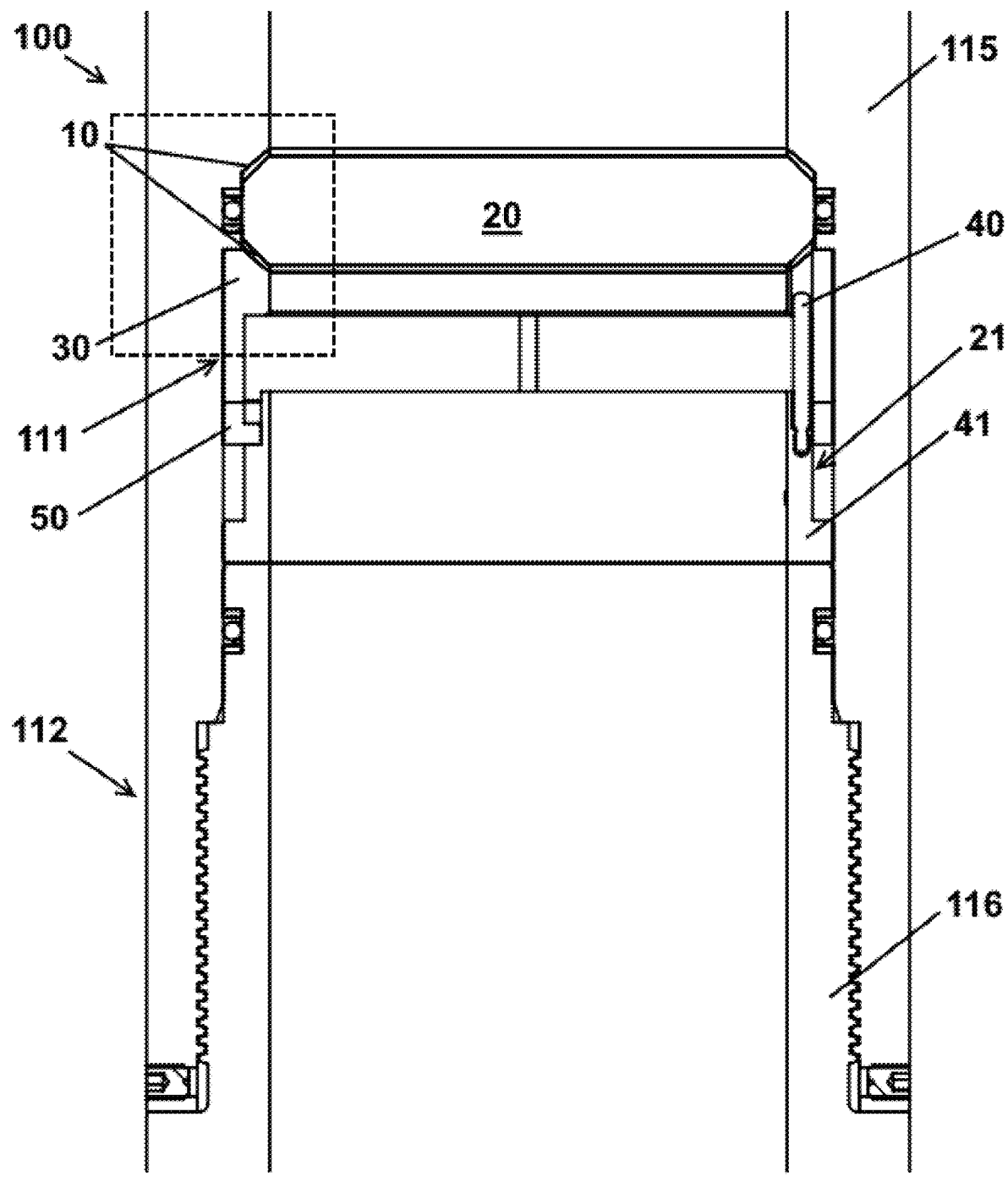
FIG. 3A discloses an example of an asymmetric bearing ring in a plug tubular
Figure 3B:
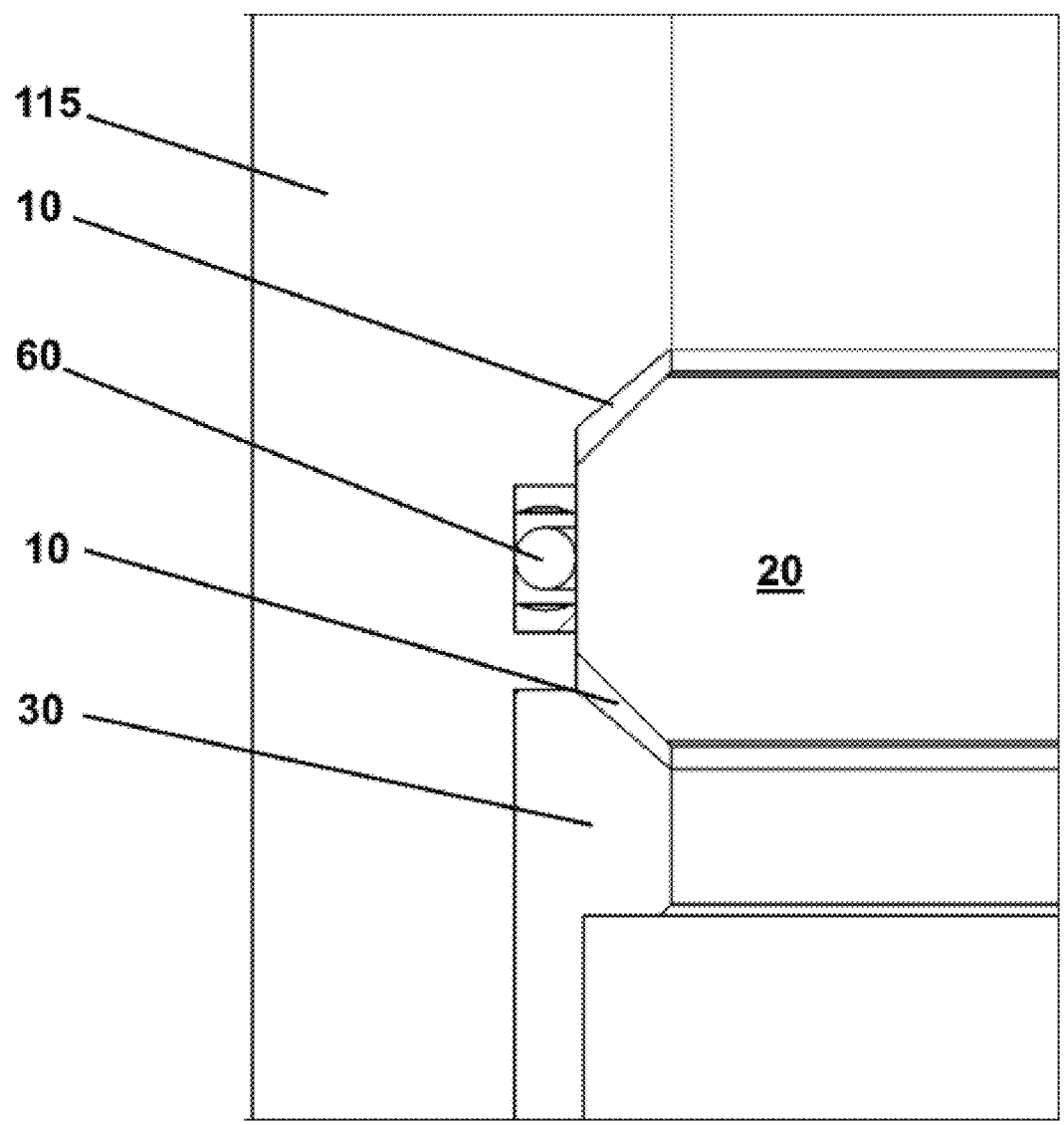
FIG. 3B discloses a close up from FIG. 3A

FIG. 3A discloses an example of asymmetric bearing ring 10 arranged in plug tubular 100. FIG. 3B is the close up between the dotted lines shown in FIG. 3A. The plug tubular 100 comprises the tubular body 112, housing 111, and the plug assembly 21. A first tubular section 115 is connected to a second tubular section 116 to form the tubular body 112. A housing 111 is arranged in the tubular body 112. Within the housing 111 is arranged a plug assembly 21. The plug assembly comprises an asymmetric bearing ring 10, a plug 20, a breaker object 40 in a breaker holder 41, a seat 30, a shear ring 50, and a sealing element 60. The sealing element prevents any fluid flow around the plug, and could e.g. be an O-ring. Normally the sealing element provides the fluid sealing of the system, and not the bearing ring 10. However, it may be desirable for the bearing ring 10 to provide additional, or the entirety of, the sealing.

A plug assembly 21 shown in this figure comprises an asymmetric bearing ring 10, a plug 20, a seat 30, a breaker object 40, and a shear ring 50. An asymmetric bearing ring 10 is arranged between a plug 20 and a seat 30. The plug 20 prevents fluid flow between the upstream side of the plug 20 and the downstream side of the plug 20. The seat 30 supports the plug 20. The breaker holder 41 keeps the breaker object 40 in position during operation of the tubular 100. A shear ring 50 is designed to shear when either enough absolute pressure or pressure difference is applied to the plug 20. When the shear ring 50 shears, the seat 30 can move. This brings the plug 20 into contact with the breaker object 40. The breaker object 40 then breaks the plug 20 and fluid flow is restored. The breaker object 40 can be held in place in a number of ways including being fastened to the housing 111 or held in a breaker holder 41. The breaker object 40 can also be attached to another tool which activates in response to a determined number of pressure pulses. The exact configuration of the plug assembly 21 is not important, but an asymmetric bearing ring 10 is arranged between the plug 20 and a material hard enough (e.g. metal) to make it break early.

Note that this is an example, but it is not the only configuration that the asymmetric bearing ring 10 will work in. An asymmetric bearing ring 10 can be used wherever protection is needed between a plug 20 and a surface which can cause it to prematurely break. In the case of the disclosed plug tubular 100 this is between the plug 20 and the seat 30 and/or between the plug 20 and the housing 111.

The figure discloses a first asymmetric bearing ring 10 arranged between the plug 20 and the seat 30. It also discloses a second asymmetric bearing ring arranged between the plug 20 and the housing 111 on the upstream side.

While the tubular body 112 has been disclosed as comprising a first tubular section 115 and a second tubular section 116, it is also possible for it to be a single continuous piece. FIGS. 4A-4D disclose the operation of a plug tubular 100. The plug tubular 100 comprises the tubular body 112, housing 111, and the plug assembly 21. The tubular body 112 comprises a first tubular section 115 attached to a second tubular section 116. In the example shown, the plug assembly 21 comprises a plug 20, an asymmetric bearing ring 10, a seat 30, and a breaker object 40. The plug assembly 21 is arranged in a housing 111. An asymmetric bearing ring 10 is arranged between the plug 20 and the seat 30 and another between the plug 20 and the housing 111.

Figures 4A, 4B:
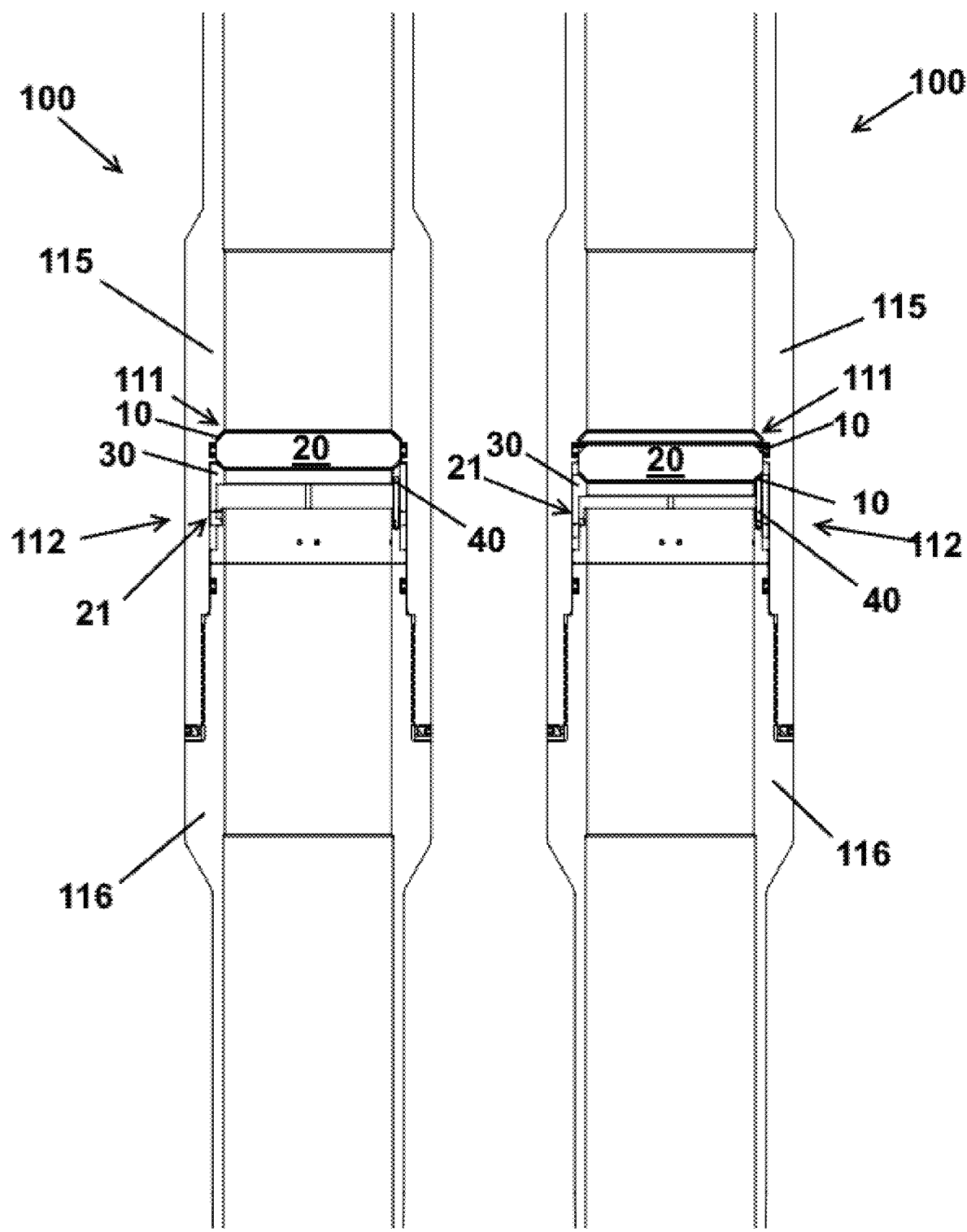
FIG. 4A-4D discloses a plug tubular under operation
Figures 4C, 4D:
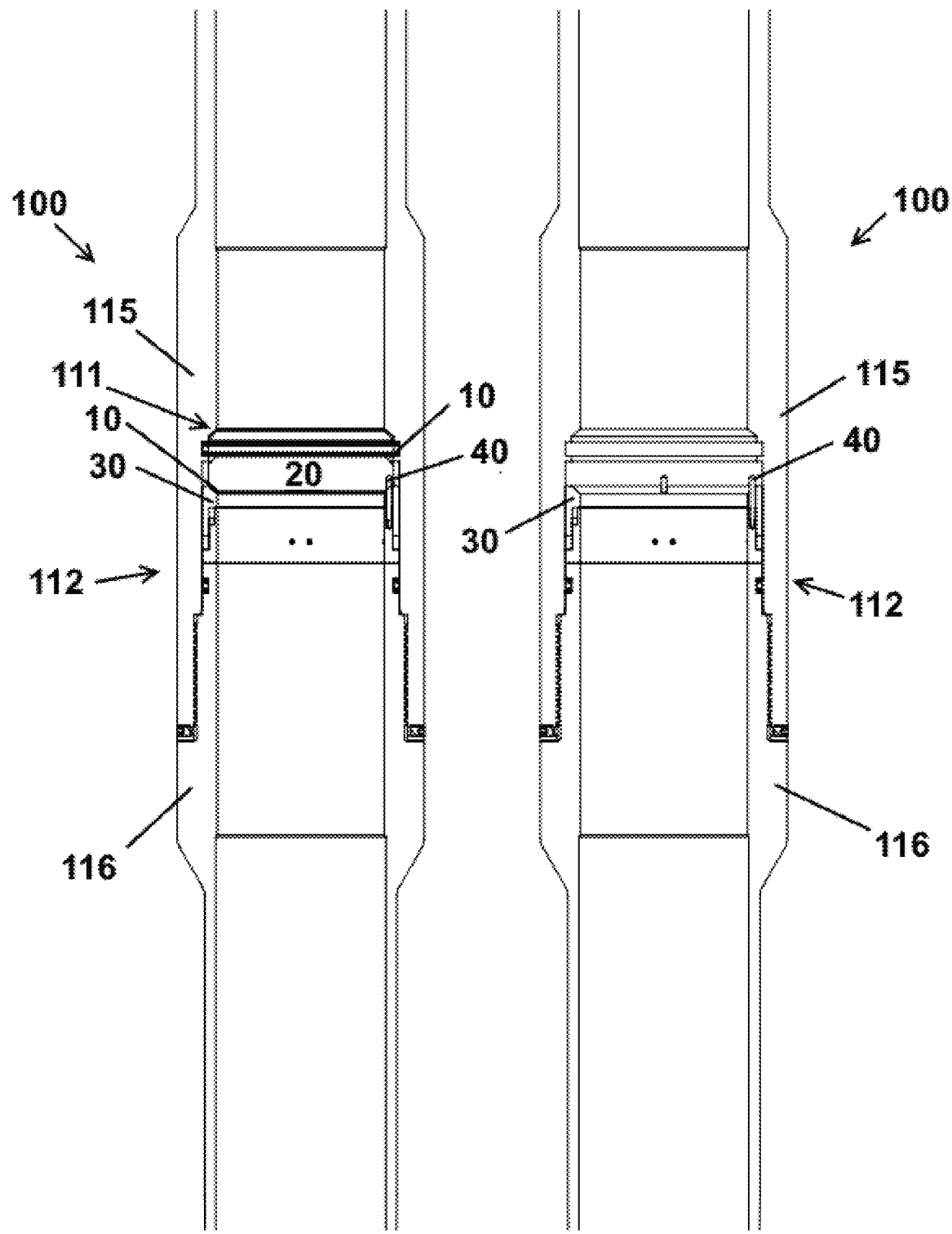

In the first position (FIG. 4A), the plug 20 is at a distance from the breaker object 40. When a sufficient absolute value or pressure differential threshold is reached, the seat 30 moves axially away from the pressure (from top to bottom in the figures). The plug 20 will make contact with the breaker object 40 and cause the plug to start breaking (FIG. 4B). The plug 20 can continue to move downwards so that the breaker object 40 is driven further into the plug 20 (FIG. 4C). Finally, the plug 20 has disintegrated and fluid flow through the tubular 100 is restored (FIG. 4D).

Figure 5A:
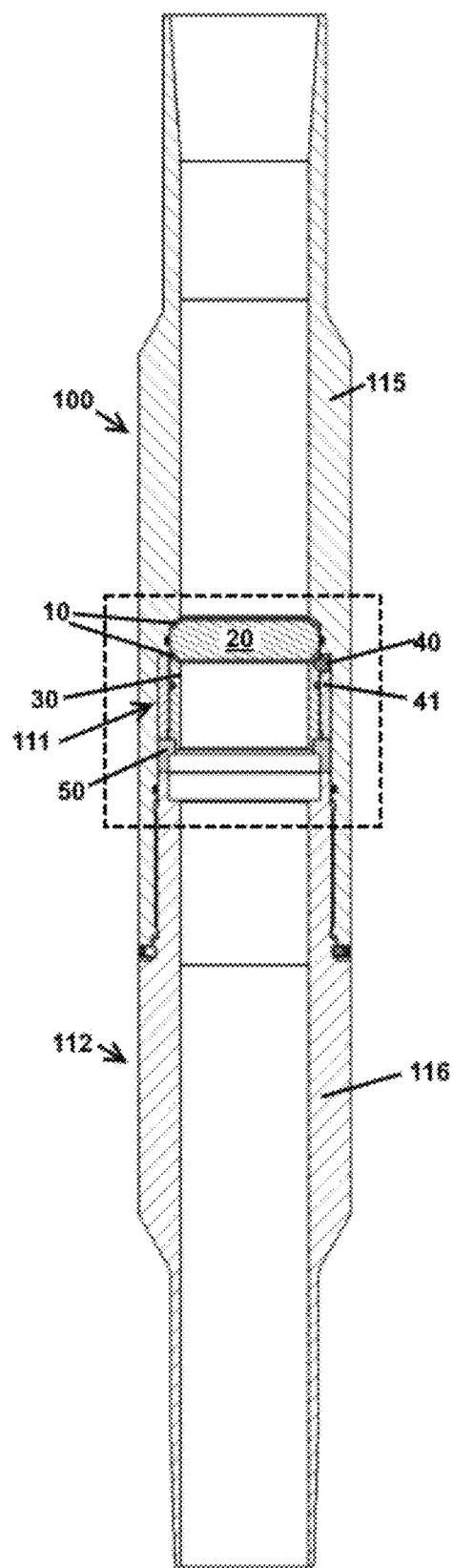
FIG. 5A discloses a bearing ring with a high taper
Figure 5B:
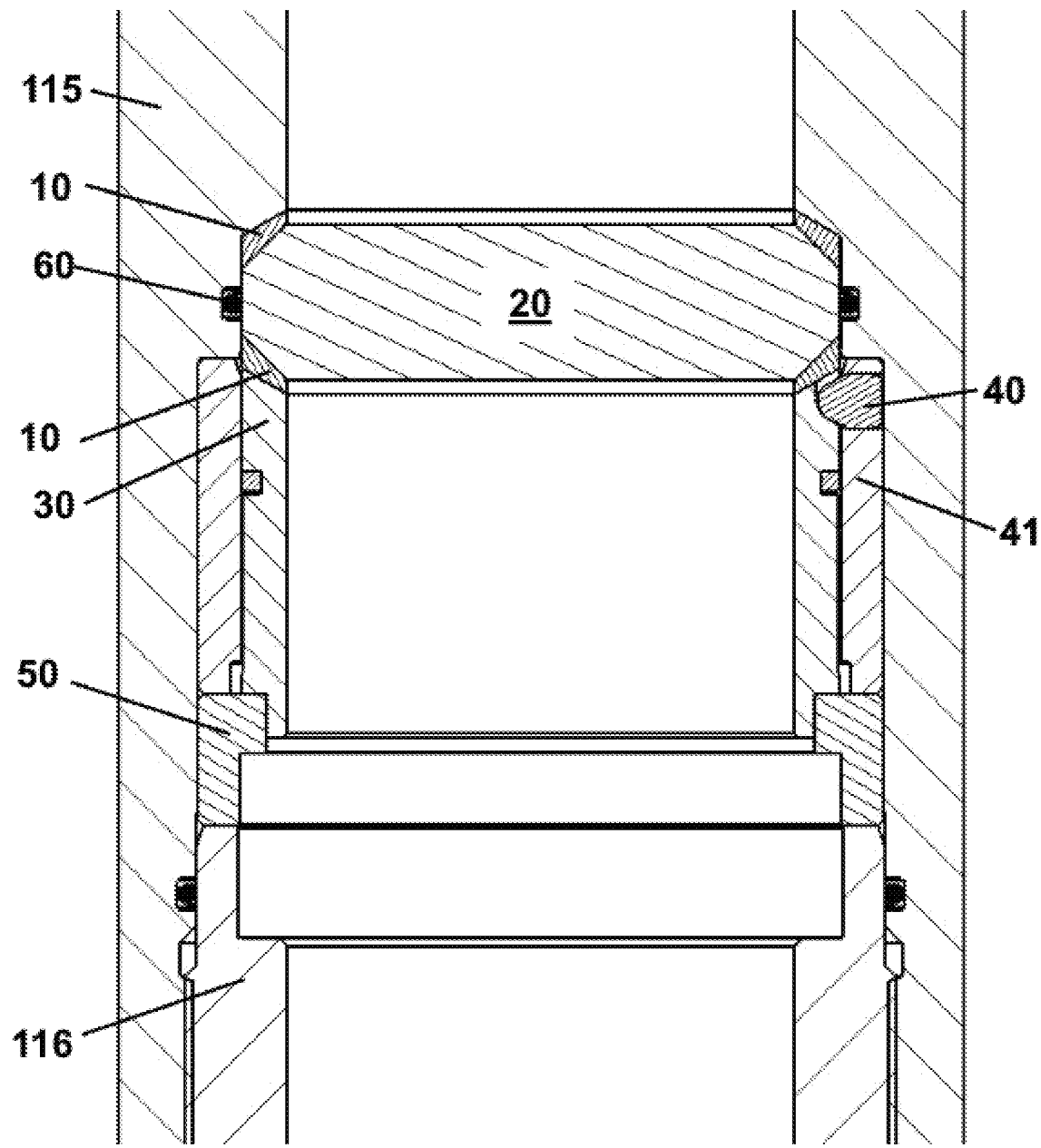
FIG. 5B discloses a close up of FIG. 5A

FIGS. 5A-5B discloses a bearing ring 10 with a higher taper, where FIG. 5B is a closeup where the shape of the bearing ring 10 is easier to see. This is indicated by the dashed lines on FIG. 5A correspond the closeup of FIG. 5B. This embodiment of the bearing ring 10 and plug tubular 100 is essentially as disclosed in FIG. 3A-B, but with a bearing ring 10 with a higher taper.

Figure 6A:
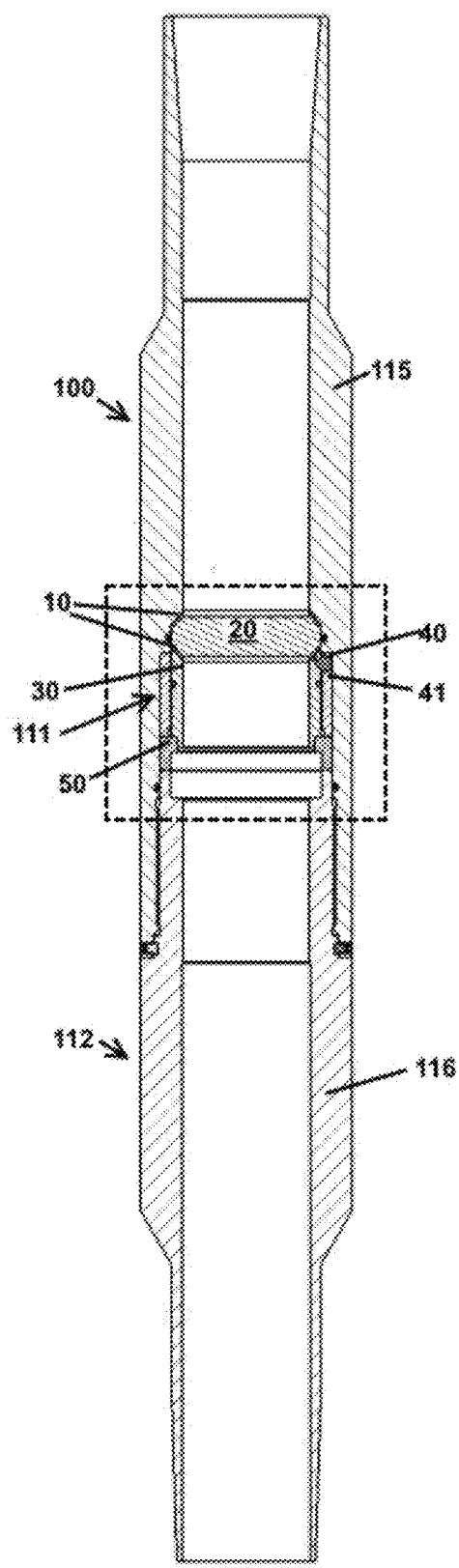
FIG. 6A discloses a bearing ring with taper on the opposite side from that of the embodiment of the other figures FIG. 6B discloses a close up of FIG. 6A FIG. 7A discloses a bearing ring comprising several layers FIG. 7B discloses a close up of FIG. 7A FIG. 7C discloses a close up of the bearing ring of FIG. 7A FIG. 8 discloses an asymmetric bearing ring in a plug tubular where the breaker object is an explosive.
Figure 6B:
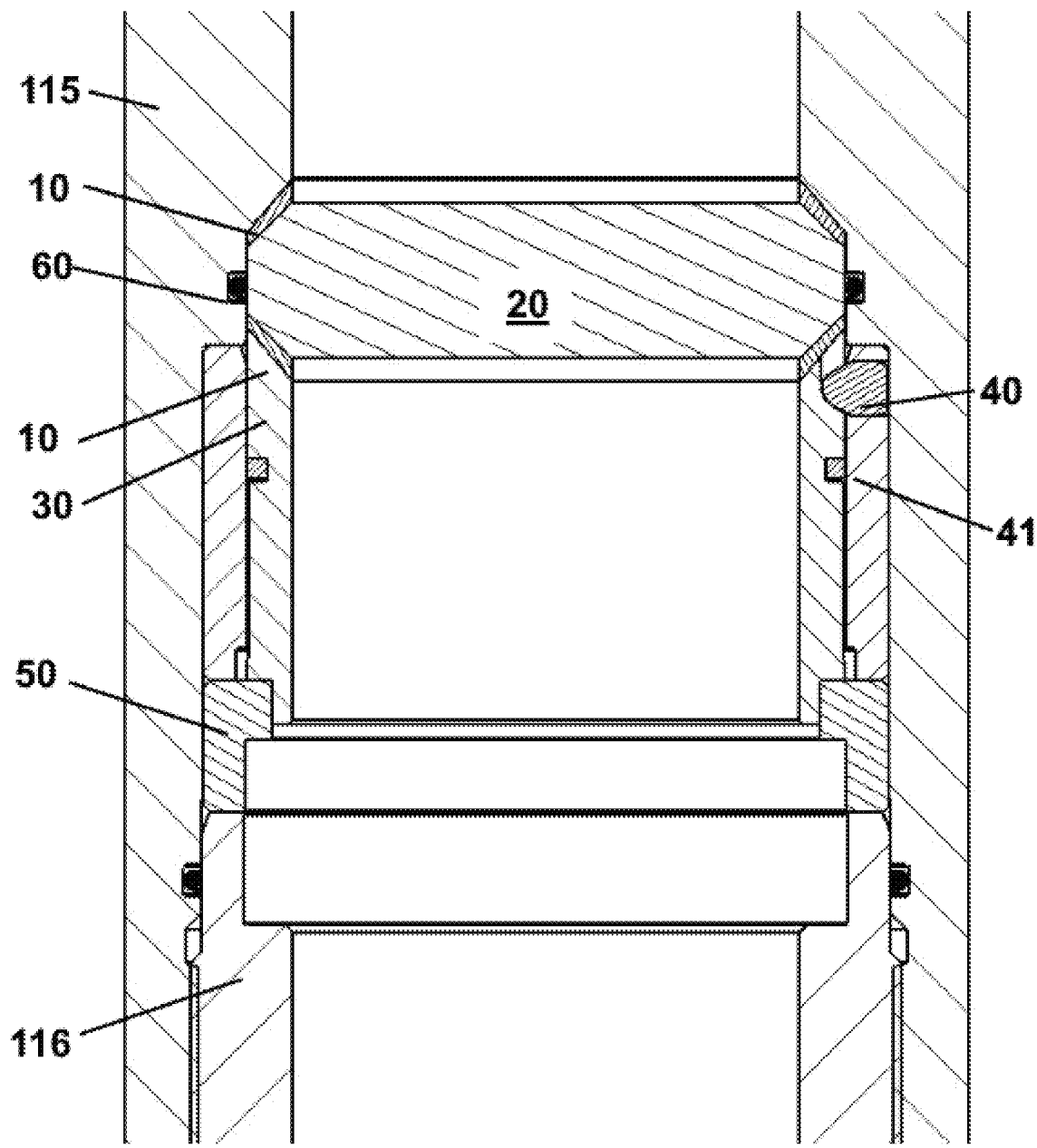

FIGS. 6A-B discloses a bearing ring 10 with the taper on the opposite side from the other embodiments shown herein. The dashed square on FIG. 6A correspond to the closeup of FIG. 6B. In other words, instead of the bearing ring 10 being thicker on its outside edge it is thicker on its inside edge. If the plug tubular 100 system is to be opened by pressure from below, i.e. as a surge open plug, or it is to be exposed to variable pressure from both uphole and downhole, this may be an advantage. It would also be possible to taper both ends of the bearing ring 10, i.e. to have a wedge shape on both the outside and inside edge thereof, so both the outside edges are thicker than the middle portion of the bearing ring 10. Or the opposite, that the middle of the bearing ring 10 is thicker than the outside edges of the bearing ring 10. This would be advantageous for the bearing ring 10 itself, but would make it more difficult to produce, as it would require that either the plug 20 and/or the plug tubular 100 the bearing ring 10 rests against has a complimentary shape that then would also have to be not straight.

Figure 7A:
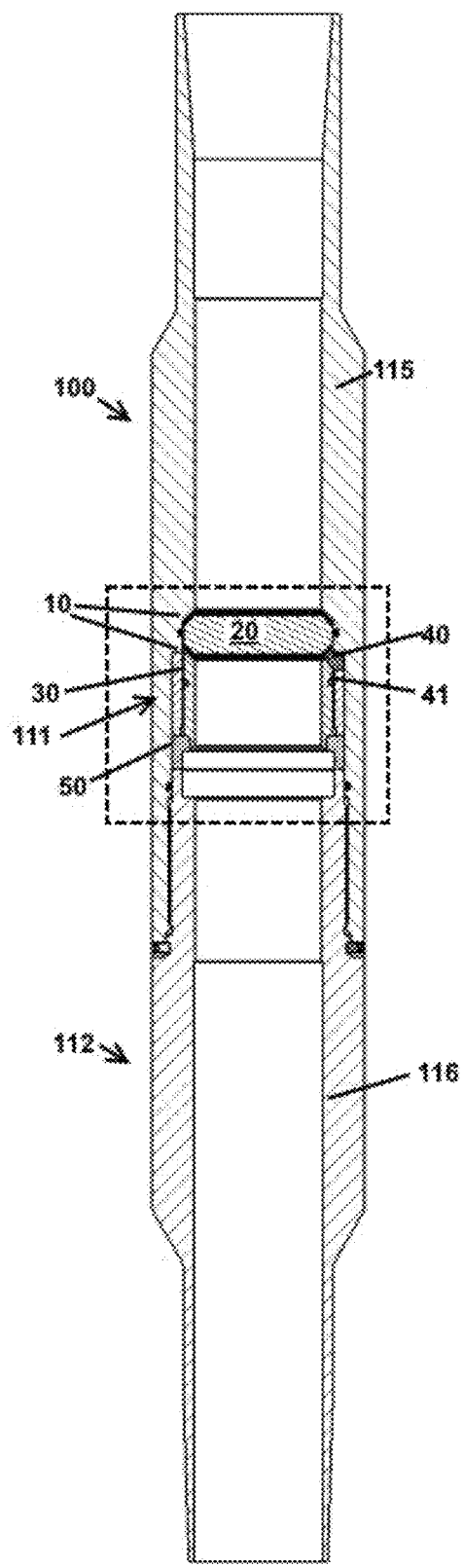
Figure 7B:
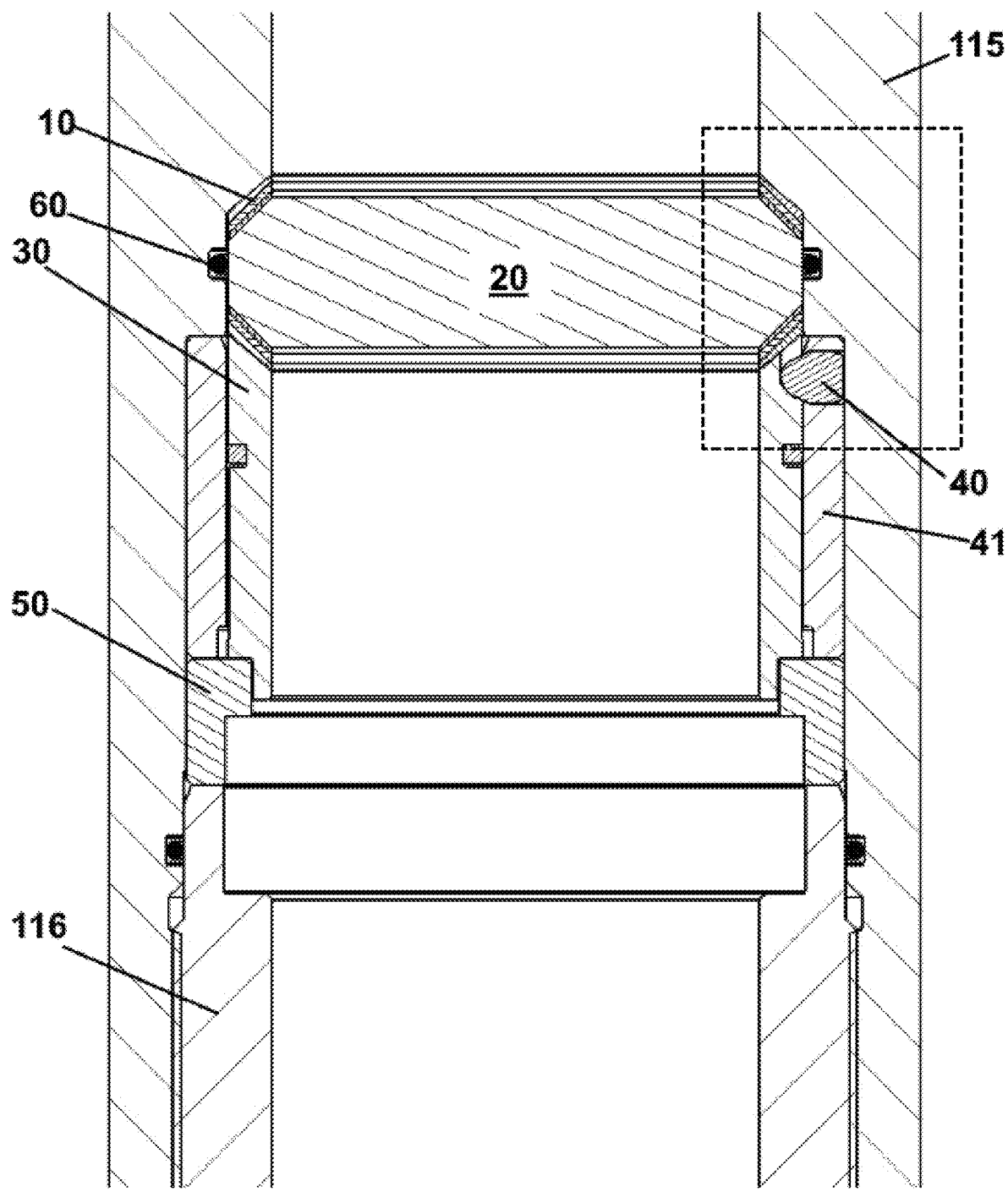
Figure 7C:
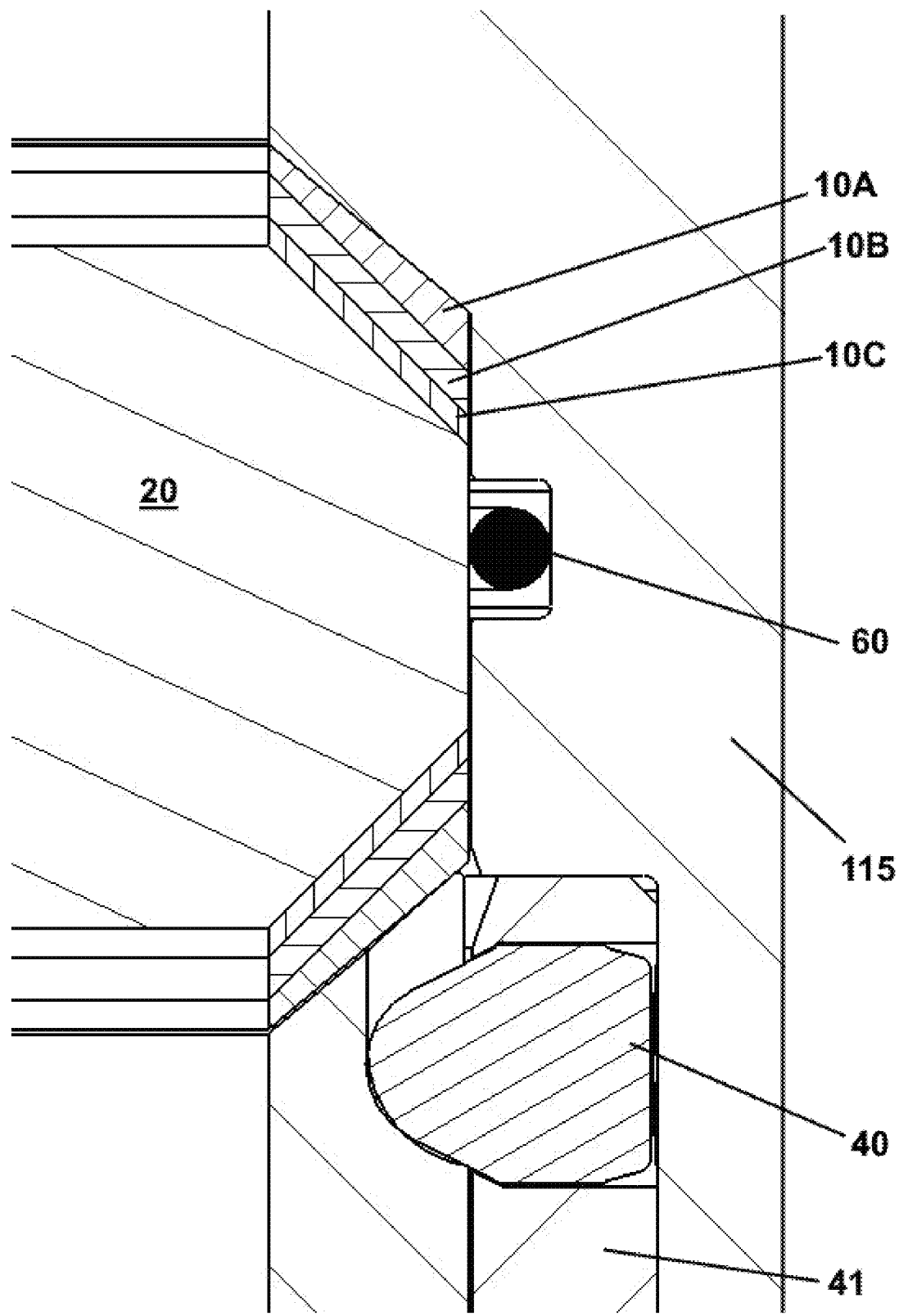

FIGS. 7A-C discloses a bearing ring 10 comprising several layers. The dashed square on FIG. 7A corresponds to FIG. 7B. The dashed square on FIG. 7B corresponds to the extreme closeup of FIG. 7C. In the specific embodiment shown, there are two layers resting against the plug 20 that are both symmetrical, and one layer located outside the symmetrical layers against the housing that is asymmetric. Together these three layers make up an asymmetric bearing ring 10. Different combinations and numbers of layers of a bearing ring 10 can thus be used to achieve the desired taper and thickness of the bearing ring 10. This can be an advantage in that bearing rings 10 with different dimensions can be produced from a set of standard layers. Thus, the height can be adjusted by adding or removing a symmetric layer, or the taper changed by exchanging a layer with a different angle or adding/removing angled layers. This way differences in the components that are within the tolerances but still add up to a noticeable difference during the assembly of a specific plug tubular 100 system can easily by adjusted for during assembly. Also, the asymmetry of the bearing ring 10 does not preclude the use of a plurality of semi symmetric layers etc. instead of only one layer.

Figure 8:
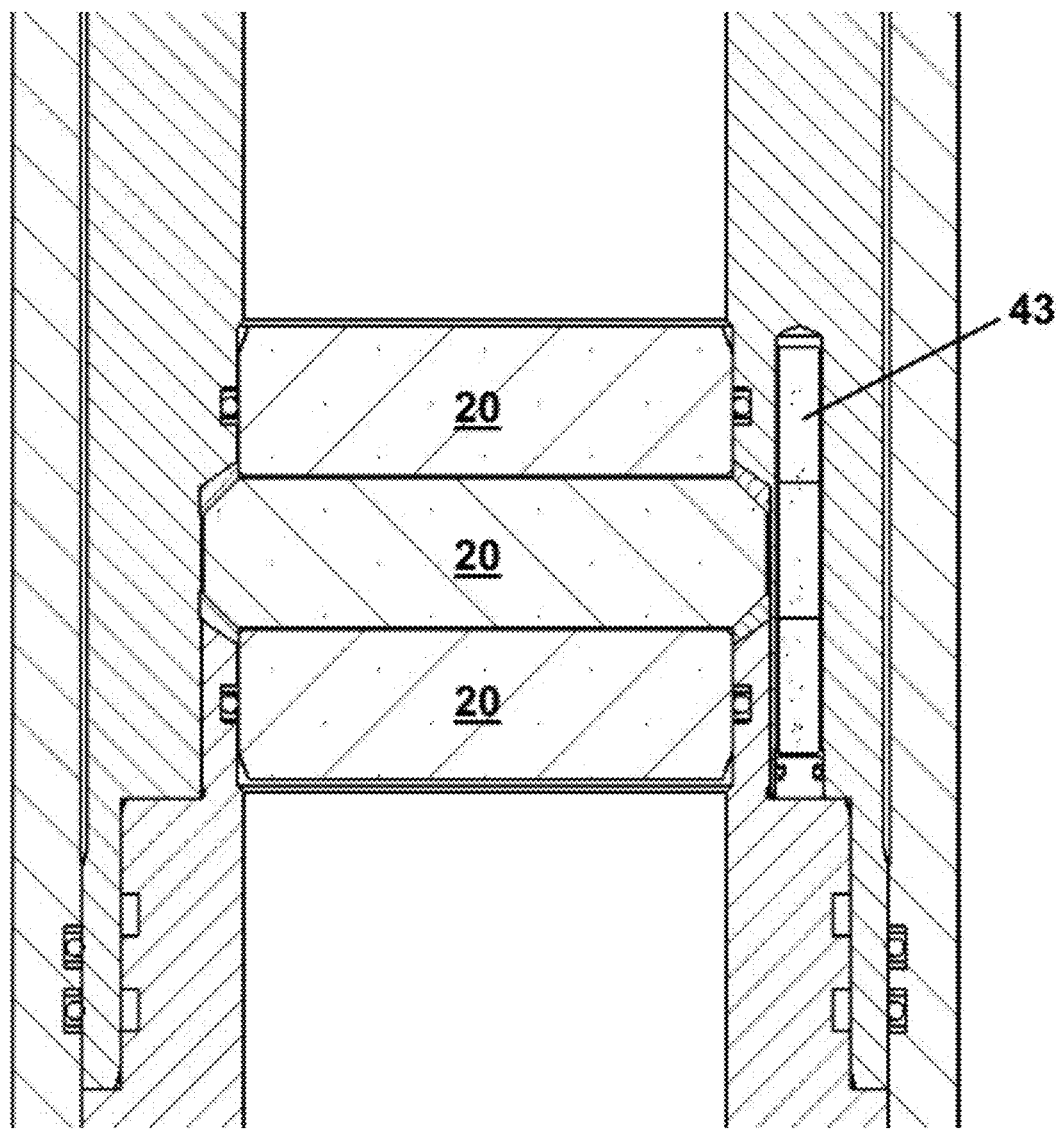

FIG. 8 discloses an asymmetric bearing ring 10 arranged in a plug tubular where the breaker object 40 is an explosive breaker 43. When triggered (e.g. by electrical signals or another tool) an explosive breaker 43 detonates an explosive. In this case, the seat 30 does not have to move in order to break the plug 20. The explosive breaker 43 can be stationary as disclosed in FIG. 8, or it can be movable with respect to the plug 20.

Depending upon the exact nature of the explosive breaker 43, it can either be in contact with the plug 20 or at a distance away from the plug 20. The further the explosive breaker 43 is away from the plug 20 the stronger the explosive would normally need to be. Another way an explosive breaker 43 can be a breaker object 40 is if the explosion results in a component moving and making contact with the plug 20.

For the asymmetric bearing ring, it is preferable that the inside angle 12 is larger than the outside angle 15. It is preferable that the inside thickness 13 is smaller than the outside thickness 16. A preferred range of the inside angle 12 are angles between 30° and 60°. A preferred range of the outside angle 15 is an angle of between 25° and 70°. Our experiments have shown that it is preferable that the inner surface angle 12 is between 2 and 10 degrees of the outer surface angle 15. It is preferable to have an inner surface angle 12 of 45 degrees with a 5 to 10 degree higher angle on the outer surface angle 15. Additionally, experiments have shown that preferably the inner thickness 13 is between 40% and 80% of the outer thickness 16. An example of the inside thickness 13 is a thickness of between 0.5 mm and 3 mm. An example of the outside thickness 16 is a thickness of between 1 mm and 6 mm. It is preferable to have an inside thickness 13 of between 0.5 mm and 1.5 mm as high thickness may give more float in the material. This float can be undesirable and can be overcome using methods known to one skilled in the art.

Please note that "step of" is not to be interpreted as "step for". By "comprised of", "comprising", "comprises" etc. we are referring to an open set and by "consisting of" we are referring to a closed set.

Modifications to the embodiments previously described are possible without departing from the scope of the invention as defined by the accompanying claims. Numerals included within parentheses in the accompanying claims are intended to assist understanding of the claims and should not be construed in any way to limit the subject matter claimed.

Reference to the singular is also to be construed as relating to the plural unless expressly stated otherwise. Any reference numbers in the claims are provided as a courtesy and are not to be interpreted as limiting the claim in any way.

It is hereby claimed:

1. An asymmetric bearing ring (10) to support a frangible plug (20) comprising:
   an annular ring with an inner surface (11) and an outer surface (14), wherein, when the annular ring is viewed from a cross section view, the inner surface (11) and the outer surface (14) are not parallel; and
   an inner surface angle (12) and an outer surface angle (15), wherein:
      the inner surface angle (12) is the angle between a first transverse plane (17A) of the asymmetric bearing ring (10) and the inner surface (11) with the smallest magnitude; and
      the outer surface angle (15) is the angle between the first transverse plane (17A), or a second transverse plane (17B) parallel to the first transverse plane (17A), of the asymmetric bearing ring (10) and the outer surface (14) with the smallest magnitude;
      wherein the inner surface angle (12) is not equal to the outer surface angle (15); and
   the inner surface angle (12) and the outer surface angle (15) have the same sign.

2. The asymmetric bearing ring (10) according to claim 1, wherein
   the asymmetric bearing ring (10) further comprises an inner thickness (13) and an outer thickness (16) wherein the inner thickness (13) is not equal to the outer thickness (13).

3. The asymmetric bearing ring (10) according to claim 2, wherein the inner thickness (13) is smaller than the outer thickness (16).

4. The asymmetric bearing ring (10) according to claim 2, wherein the inner thickness (13) is between 0.5 mm and 3 mm, and/or the outer thickness (16) is between 1.0 mm and 6.0 mm.

5. The asymmetric bearing ring (10) according to claim 2, wherein the inner thickness (13) is between 40% and 80% of the outer thickness (16).

6. The asymmetric bearing ring (10) according to claim 1, wherein the inner surface angle (12) is larger than the outer surface angle (15).

7. The asymmetric bearing ring (10) according to claim 1, wherein the inner surface angle (12) is between 30 and 60 degrees and/or the outer surface angle (15) is between 25 and 70 degrees.

8. The asymmetric bearing ring (10) according to claim 1, wherein the difference between the inner surface angle (12) and the outer surface angle (15) is between 2 and 10 degrees of the outer surface angle (15).

9. The asymmetric bearing ring (10) according to claim 1, wherein the asymmetric bearing ring (10) comprises a plurality of elements.

10. The asymmetric bearing ring (10) according to claim 1, wherein the asymmetric bearing ring (10) is arranged between the plug (20) and a seat (30).

11. A plug tubular system (100) comprising:
    a tubular body (112), and a plug assembly (21),
    the tubular body (112) comprising a housing (111),
    the plug assembly arranged in the housing comprising:
    a fragile plug (20), an asymmetric bearing ring (10) and a seat (30), the asymmetric bearing ring (10) comprises:

an annular ring with an inner surface (11) and an outer surface (14), wherein the inner surface (11) and the outer surface (14) are not parallel, further:

the seat (30) supports the plug (20); and wherein:

the asymmetric bearing ring (10) is arranged between the plug (20) and the seat (30); or the asymmetric bearing ring (10) is arranged between the plug (20) and the housing (111); and the asymmetric bearing ring (10) further comprises an inner surface angle (12) and an outer surface angle (15), wherein:

the inner surface angle (12) is the angle between a first transverse plane (17A) of the asymmetric bearing ring (10) and the inner surface (11) with the smallest magnitude; and the outer surface angle (15) is the angle between the first transverse plane (17A), or a second transverse plane parallel to the first transverse plane (17B), of the asymmetric bearing ring (10) and the outer surface (14) with the smallest magnitude;

wherein the inner surface angle (12) is not equal to the outer surface angle (15); and the inner surface angle (12) and the outer surface angle (15) have the same sign.

12. The plug tubular system (100) according to the claim 11, wherein a breaker object (40) is arranged to break the plug (20).

13. The plug tubular system (100) according to claim 12, wherein the breaker object (40) is an explosive breaker (43).

14. The plug tubular system (100) according claim 11, wherein:

a breaker object (40) is arranged at a distance from the plug (20); and the breaker object (40) is configured to break the plug (20) when the breaker object (40) touches the plug (20).

15. The plug tubular system (100) according claim 11, wherein the asymmetric bearing ring (10) further comprises an inner thickness (13) and an outer thickness (16) wherein the inner thickness (13) is not equal to the outer thickness (13).

16. The plug tubular system (100) according to claim 15, wherein the inner thickness (13) is smaller than the outer thickness (16).

17. The plug tubular system (100) according to claim 11, wherein the inner surface angle (12) is larger than the outer surface angle (15).

18. The plug tubular system (100) according to claim 11, wherein the asymmetric bearing ring (10) comprises a plurality of elements.

* * * * *